US012563658B1

(12) United States Patent
Sultana et al.

(10) Patent No.: US 12,563,658 B1
(45) Date of Patent: Feb. 24, 2026

(54) FLUID DIFFUSION SYSTEM AND METHOD FOR DIELECTRIC BARRIER DISCHARGE SYSTEM

(71) Applicant: Schlumberger Technology Corporation, Sugar Land, TX (US)

(72) Inventors: Ruhi Sultana, Cambridge, MA (US); Gary W. Sams, Spring, TX (US); Shawn David Taylor, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/239,775

(22) Filed: Jun. 16, 2025

(51) Int. Cl.
*H05H 1/24* (2006.01)

(52) U.S. Cl.
CPC ....... *H05H 1/2437* (2021.05); *H05H 2242/10* (2013.01)

(58) Field of Classification Search
CPC .. H05H 1/2437; H05H 2242/10; H05H 9/005; H05H 5/06; H05H 7/14; H05H 5/03; H05H 7/16
See application file for complete search history.

(56) References Cited

U.S. PATENT DOCUMENTS

2015/0232353 A1* 8/2015 Denvir .................. C02F 1/4608 210/150

FOREIGN PATENT DOCUMENTS

| | | | | |
|---|---|---|---|---|
| CN | 113242839 A | * 8/2021 | .............. C02F 1/008 |
| CN | 117065778 A | * 11/2023 | .............. B01J 27/24 |
| CN | 120277864 A | * 7/2025 | |
| KR | 20210039789 A | * 4/2021 | .......... C02F 1/46104 |
| WO | WO-2015164760 A1 | * 10/2015 | ............ C02F 1/4608 |
| WO | WO-2024081409 A1 | * 4/2024 | ........ H01M 10/6567 |
| WO | WO-2025003926 A2 | * 1/2025 | ............ G01N 21/67 |

* cited by examiner

*Primary Examiner* — Abdullah A Riyami
*Assistant Examiner* — Syed M Kaiser
(74) *Attorney, Agent, or Firm* — Jeffrey D. Frantz

(57) ABSTRACT

A system includes a dielectric barrier discharge (DBD) reactor. The DBD reactor includes a plurality of dielectric barriers. The DBD reactor also includes a plurality of electrodes disposed between the plurality of dielectric barriers. The system also includes a diffuser system fluidly coupled to an outlet of the DBD reactor. The diffuser system is configured to direct a fluid output through the outlet to one or more channels disposed between the plurality of dielectric barriers. The diffuser system includes a diffuser configured to diffuse the fluid into the one or more channels to cool at least one dielectric barrier of the plurality of dielectric barriers.

20 Claims, 6 Drawing Sheets

FLUID DIFFUSION SYSTEM AND METHOD FOR DIELECTRIC BARRIER DISCHARGE SYSTEM

BACKGROUND

The subject matter disclosed herein relates to a diffuser system for a dielectric barrier discharge (DBD) system.

DBD systems rely on dielectric barrier discharge, which is an electrical charge between two electrodes separated by a dielectric barrier (e.g., dielectric plate, insulating dielectric barrier, insulator, etc.). The electrical charge is created by applying a voltage (e.g., AC voltage) to one or both electrodes. The power applied to the electrodes causes the dielectric barriers to heat up and degrade. Accordingly, it is desirable to develop techniques for managing heat in the dielectric barriers.

SUMMARY

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In certain embodiments, a system includes a dielectric barrier discharge (DBD) reactor. The DBD reactor includes a plurality of dielectric barriers. The DBD reactor also includes a plurality of electrodes disposed between the plurality of dielectric barriers. The system also includes a diffuser system fluidly coupled to an outlet of the DBD reactor. The diffuser system is configured to direct a fluid output through the outlet to one or more channels disposed between the plurality of dielectric barriers. The diffuser system includes a diffuser configured to diffuse the fluid into the one or more channels to cool at least one dielectric barrier of the plurality of dielectric barriers.

In certain embodiments, a system includes a diffuser system fluidly coupled to an outlet of a dielectric barrier discharge (DBD) reactor. The diffuser system is configured to direct a fluid output through the outlet to one or more channels disposed between a plurality of dielectric barriers of the DBD reactor. The diffuser system includes a diffuser configured to diffuse the fluid into the one or more channels to cool at least one dielectric barrier of the plurality of dielectric barriers. The system also includes a controller having a memory and one or more processors. The controller is configured to monitor a temperature of a dielectric barrier of the plurality of dielectric barriers. The controller is also configured to adjust a flowrate of the fluid based on the temperature.

In certain embodiments, a method includes monitoring, via a processor, a temperature of a dielectric barrier of a dielectric barrier discharge (DBD) reactor. The method also includes controlling, via the processor, a valve, a pump, or both, to adjust a flow rate of a fluid directed from an outlet of the DBD reactor to a diffuser based on the temperature. The method also includes injecting, via the diffuser, the fluid toward the dielectric barrier to cool the dielectric barrier.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
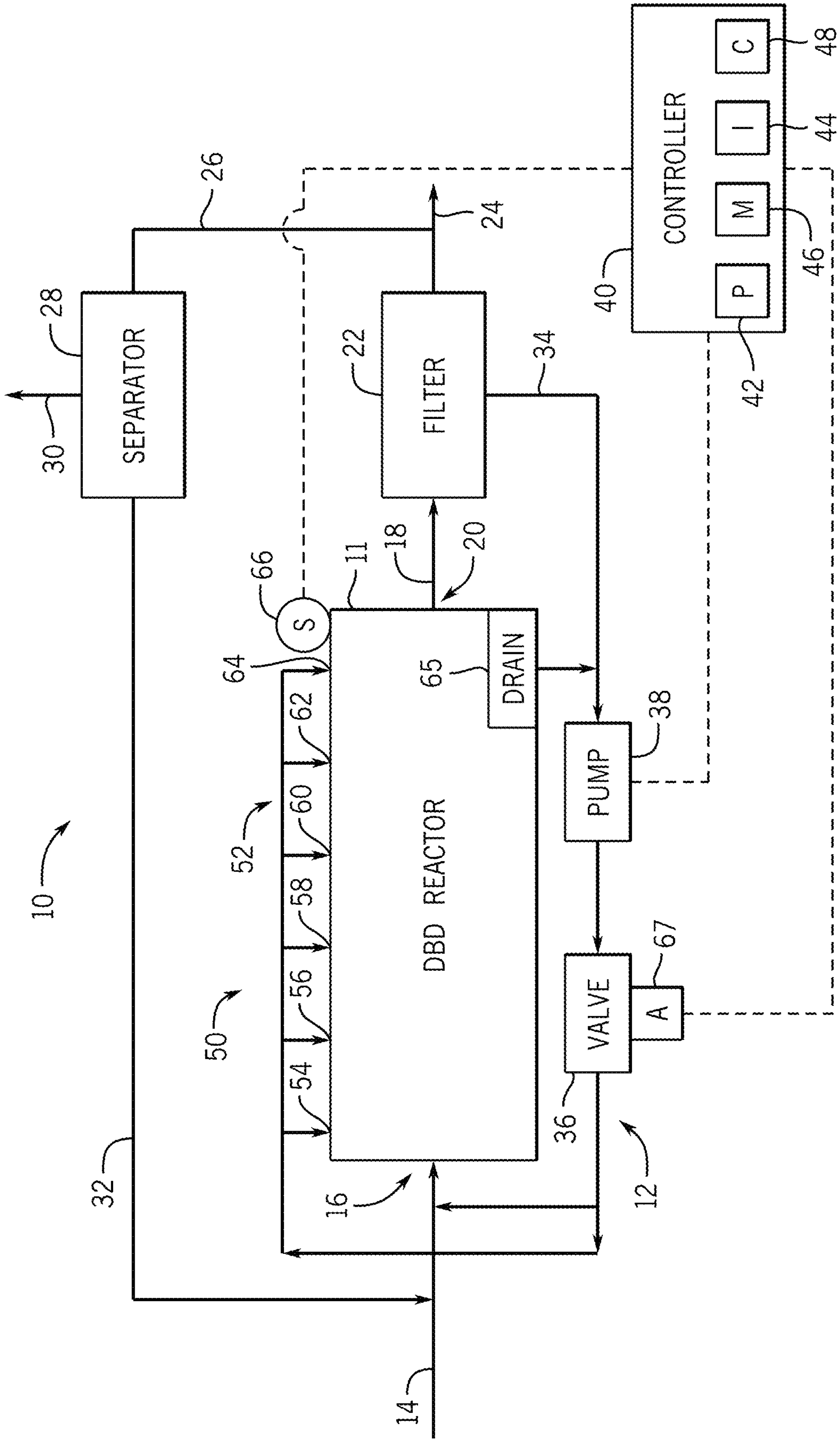
FIG. 1 is a schematic view of an embodiment of a dielectric barrier discharge (DBD) system having a DBD reactor and a diffuser system.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening stations between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

The present disclosure is generally directed to a dielectric barrier discharge (DBD) system having a DBD reactor, and a diffuser system that receives a portion of a process fluid output by the DBD reactor and diffuses the process fluid back into the DBD reactor. The diffuser system includes a diffuser having one or more conduits that may aerosolize the process fluid that enters the one or more channels of the DBD reactor. The present disclosure also provides a method for controlling a flow rate of the process fluid to be diffused into the DBD reactor by the diffuser system. A controller may receive one or more signals from one or more sensors disposed in the DBD reactor indicative of a temperature of one or more dielectric barriers of the DBD reactor. The controller may increase a flow rate of the diffused process fluid based on the monitored temperature being greater than an upper threshold temperature. Additionally or alternatively, the controller may decrease a flow rate of the diffused process fluid based on the monitored temperature being less than a lower threshold temperature.

FIG. 1 is a schematic view of an embodiment of a dielectric barrier discharge (DBD) system 10 having a DBD reactor 11 (e.g., DBD plasma reactor) and a diffuser system 12. As described in further detail herein, the DBD reactor 11 relies on dielectric barrier discharge, which is an electrical charge between two electrodes separated by a dielectric barrier (e.g., dielectric plate, insulating dielectric barrier, insulator, etc.). In certain embodiments, the dielectric barrier includes glass, alumina, polymer films, and the like. The electrical charge is created by applying a voltage (e.g., AC voltage) to one or both electrodes. When a gas (e.g., anhydrous ammonia, hydrogen sulfide, carbon dioxide, etc.) is present between the two electrodes, the dielectric barrier discharge may be used for generating plasma. Dielectric barrier discharge is used in ozone generation, plasma displays, excimer lamps, and decomposing harmful exhaust gases.

In the illustrated embodiment, the DBD reactor 11 receives a gas flow 14 into an inlet 16 of the DBD reactor 11. The gas flow 14 is subjected to dielectric barrier discharge in the DBD reactor 11, which converts the gas flow 14 into a process fluid 18 (e.g., process liquid, process gas, process liquid-gas mixture, etc.). In certain embodiments, the gas flow 14 and/or the process fluid 18 may include a hydrocarbon (e.g., methane, ethane, propane, butane, pentane, hexane, heptane, octane, nonane, decane, etc.). In certain embodiments, a heat of evaporation of the process fluid 18 may be used to provide cooling to the DBD reactor 11, as discussed in further detail herein. As shown, the process fluid 18 is output from the DBD reactor 11 through an outlet 20 of the DBD reactor 11. The process fluid 18 flows from the outlet 20 to a filter 22 configured to filter out particulate that may be in the process fluid 18 and/or sanitize the process fluid 18. In certain embodiments, the filter 22 may be omitted.

In the illustrated embodiment, a portion 24 of the process fluid 18 is expelled from the DBD system 10 after passing through the filter 22. A portion 26 of the process fluid 18 flows to a separator 28 configured to separate one or more components 30 (e.g., hydrogen) from the portion 26 of the process fluid 18. As shown, the separated process fluid 32 is recirculated back to the inlet 16 of the DBD reactor 11. Another portion 34 of the process fluid 18 is diverted to the diffuser system 12. In certain embodiments, the portion 34 of the process fluid 18 may be between 10 percent and 20 percent of the process fluid 18 that is output by the DBD reactor 11.

In the illustrated embodiment, the diffuser system 12 includes a valve 36, a pump 38, and a controller 40. The controller 40 includes one or more processors 42 configured to execute instructions 44 stored on the memory 46 via circuitry 48. In the illustrated embodiment, the portion 34 of the process fluid 18 flows through both the pump 38 and the valve 36. In the illustrated embodiment, the valve 36 is disposed downstream of the pump 38. In certain embodiments, the pump 38 may be disposed downstream of the valve 36. In certain embodiments, either the valve 36 or the pump 38 may be omitted.

In the illustrated embodiment, the diffuser system 12 includes a diffuser 50. As shown, the diffuser 50 is configured to inject the portion 34 of the process fluid 18 at one or more locations 52 (e.g., location 54, 56, 58, 60, 62, 64) into the DBD reactor 11. Additionally or alternatively, the diffuser system 12 (e.g., via the diffuser 50) diffuses the portion 34 of the process fluid 18 into the inlet 16 of the DBD reactor 11. In the illustrated embodiment, the DBD reactor 11 includes a drain 65 configured to collect excess process fluid 18 and recirculate it back to the diffuser 50. In certain embodiments, the drain 65 may be omitted.

In the illustrated embodiment, the diffuser system 12 includes one or more sensors 66 disposed in the DBD reactor 11. The one or more sensors 66 may be configured to measure one or more characteristics of the DBD reactor 11. For example, the one or more sensors 66 may be configured to produce a signal indicative of a temperature of one or more dielectric barriers (not shown) of the DBD reactor 11. Additionally or alternatively, the one or more sensors 66 may be configured to produce one or more signals indicative of a pressure inside the DBD reactor 11, a humidity inside the DBD reactor 11, or both. As shown, the controller 40 is communicatively coupled to an actuator 67 of the valve 36 and the pump 38. In certain embodiments, the controller 40 may be configured to adjust a flow rate of the portion 34 of the process fluid 18 based on one or more signals received from the one or more sensors 66, the one or more signals indicative of the temperature of the one or more dielectric barriers, the pressure inside the DBD reactor 11, the humidity inside the DBD reactor 11, or a combination thereof.

Figure 2:
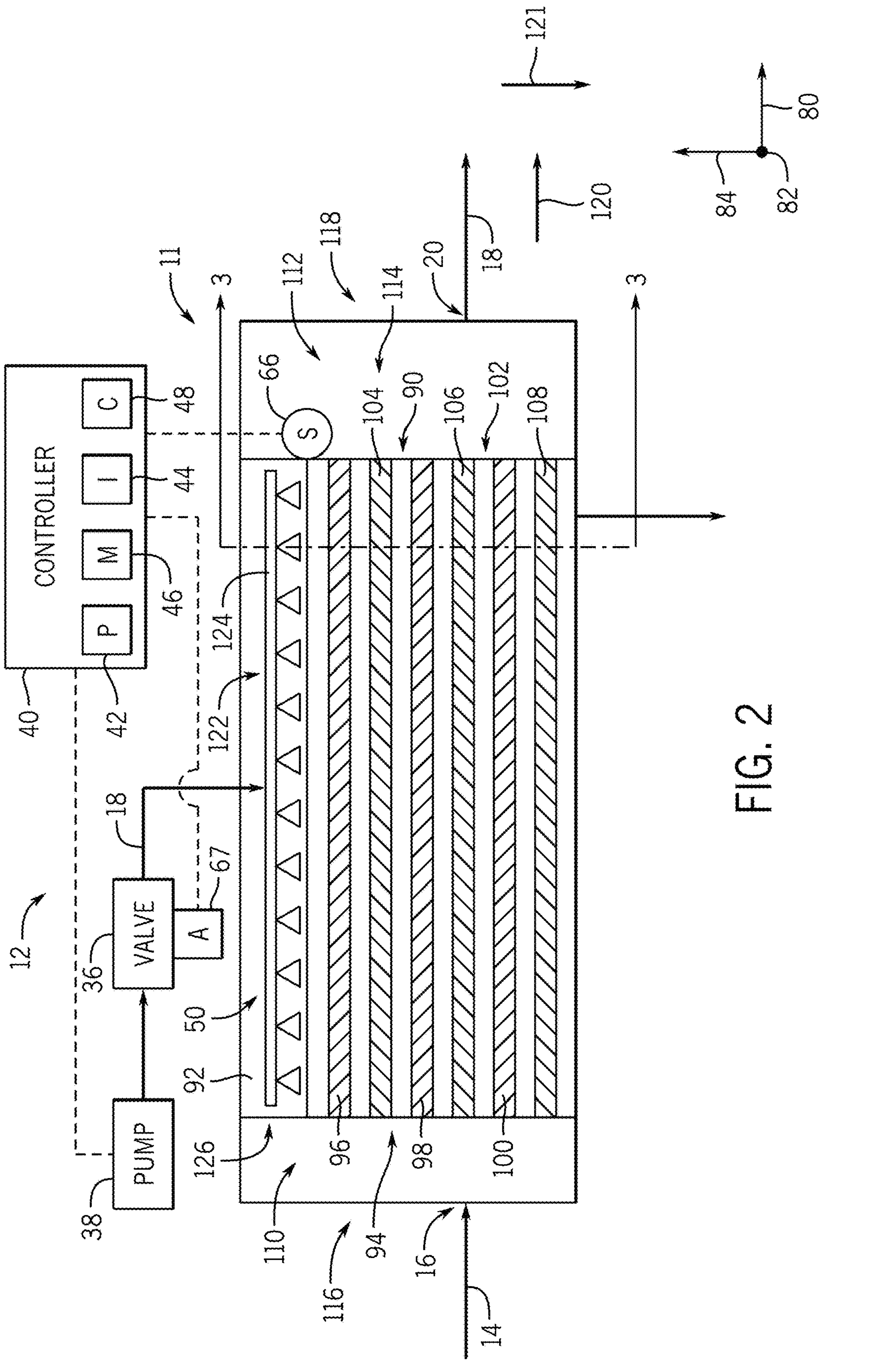
FIG. 2 is a schematic cutaway view an embodiment of the DBD reactor of FIG. 1, further illustrating a diffuser of the diffuser system.

FIG. 2 is a schematic cutaway view an embodiment of the DBD reactor 11, further illustrating the diffuser 50 of the diffuser system 12. The DBD reactor 11 and the diffuser system 12 may be described in reference to a longitudinal direction or axis 80, a lateral direction or axis 82, and a vertical direction or axis 84. In the illustrated embodiment, the DBD reactor 11 includes a plurality of dielectric barriers 90 (e.g., dielectric barrier 92), a plurality of electrodes 94 (e.g. electrode 96, 98, 100), a plurality of electrodes 102 (e.g., electrode 104, 106, 108), an inlet header 110, and an outlet header 112. The electrodes 94 are electrically coupled to a first voltage and the electrodes 102 are electrically coupled to a second voltage, such that the first voltage and the second voltage are different from one another. In certain embodiments, the second voltage of the electrodes 102 may be grounded. As shown, the electrodes 94 and the electrodes 102 extend along the longitudinal direction 80, and are positionally alternated along the vertical direction 84. The DBD reactor 11 also includes a plurality of channels 114 disposed between successive dielectric barriers 90 (e.g., dielectric plates). It may be recognized that other designs and/or configurations of the DBD reactor 11 may be used.

In the illustrated embodiment, the inlet header 110 is disposed on a longitudinal side 116 of the dielectric barriers 90 and the outlet header 112 is disposed on a longitudinal side 118 of the dielectric barriers 90. The inlet header 110 and the outlet header 112 are both fluidly coupled to the channels 114 of the DBD reactor 11. As shown, the gas flow 14 is received into the inlet header 110 through the inlet 16 of the DBD reactor 11. The channels 114 are configured to receive the gas flow 14 from the inlet header 110, such that the gas flow 14 flows through the channels 114 along a direction 120. The channels 114 feed the gas flow 14 into the outlet header 112. The gas flow 14 is collected in the outlet header 112 and flows out of the DBD reactor 11 through the outlet 20.

In the illustrated embodiment, the electrodes 94 and the electrodes 102 are oriented along the direction 120. In certain embodiments, the electrodes 94 and the electrodes 102 may run vertically along a vertical direction 121, such that the gas flow 14 flows in the vertical direction 121 (e.g., downward).

In the illustrated embodiment, the diffuser 50 of the diffuser system 12 is disposed on a side (e.g., vertical side) of the dielectric barriers 90. As shown, the diffuser 50 includes one or more conduits 122 (e.g., conduit 124) that longitudinally extend between the inlet header 110 and the outlet header 112. The diffuser 50 includes a plurality of apertures 126 formed into the conduits 122 through which the process fluid 18 is ejected. The diffuser 50 is configured to inject the process fluid 18 (via the apertures 126) into the one or more channels 114, such that the injected process fluid 18 travels in a direction 121 (e.g., vertical direction) that is crosswise to the direction 120 in which the gas flow 14 travels through the DBD reactor 11. In certain embodiments, both the injected process fluid 18 and the gas flow 14 may flow in the vertical direction 121 (e.g., downward) such that the gas flow 14 and the injected process fluid 18 flow generally parallel to one another.

In the illustrated embodiment, the controller 40 is communicatively coupled to the valve 36, the pump 38, and the one or more sensors 66. As discussed herein, the controller 40 may be configured to send instructions to the actuator 67 of the valve 36 and/or the pump 38 based on a signal received from the one or more sensors 66. In certain embodiments, the one or more sensors 66 may be configured to provide the controller 40 with a signal indicative of a temperature of the one or more dielectric barriers 90, a pressure within the DBD reactor 11, a humidity within the DBD reactor 11, or a combination thereof.

Figure 3:
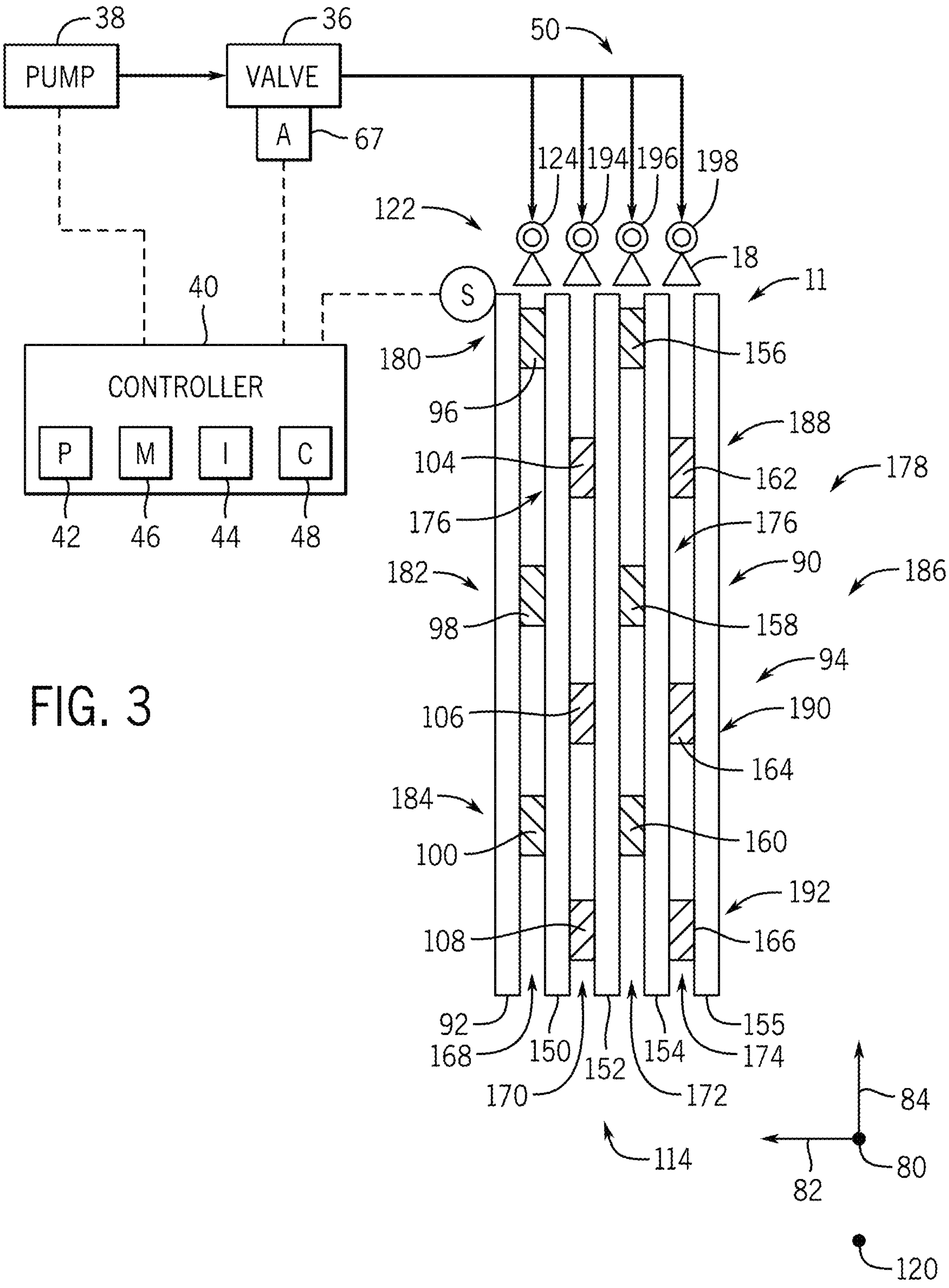
FIG. 3 is a side cross-sectional schematic view of an embodiment of the DBD reactor and the diffuser taken along line 3-3 in FIG. 2.

FIG. 3 is a side cross-sectional schematic view of the DBD reactor 11 and the diffuser 50 taken along line 3-3 in FIG. 2. In the illustrated embodiment, the DBD reactor 11 includes the dielectric barriers 90 (e.g., dielectric barrier 92, 150, 152, 154, 155), the electrodes 94 (e.g., electrode 96, 98, 100, 156, 158, 160), the electrodes 102 (e.g., electrode 104, 106, 108, 162, 164, 166), the channels 114 (e.g., channels 168, 170, 172, 174). As shown, the DBD reactor 11 also includes a plurality of gas passages 176 disposed within each channel 114 and between successive electrodes 94 or electrodes 102.

In the illustrated embodiment, the electrodes 94 and the electrodes 102 extend longitudinally across the DBD reactor 11. As shown, the electrodes 94 are vertically arrayed in the channels 168, 172, and the electrodes 102 are vertically arrayed in the channels 170, 174. In the illustrated embodiment, the electrodes 94 are vertically staggered from the electrodes 102. In certain embodiments, the electrodes 94 may not be staggered from the electrodes 102. As shown, the electrodes 94 are aligned into rows 178 (e.g., row 180, 182, 184) of electrodes 94, and the electrodes 102 are aligned into rows 186 (e.g., row 188, 190, 192) of electrodes 102. In certain embodiments, the electrodes 94 of and/or the electrodes 102 may be arranged randomly (e.g., not in rows).

In the illustrated embodiment, the DBD reactor 11 includes five dielectric barriers 90 and four channels 114. In certain embodiments, the DBD reactor 11 may include fewer or more dielectric barriers 90 and channels 114. For example, the DBD reactor 11 may include 2, 3, 4, 6, 7, 8, or more dielectric barriers 90. Additionally or alternatively, the DBD reactor 11 may include 1, 2, 3, 5, 6, 7, or more channels 114. In the illustrated embodiment, the channels 114 each include either three electrodes 94 or three electrodes 102. In certain embodiments, the channels 114 may include fewer or more than three electrodes 94 or three electrodes 102. For example, one or more of the channels 114 may include 1, 2, 4, 5, 6, or more electrodes 94 or electrodes 102.

In the illustrated embodiment, the diffuser system 12 includes the diffuser 50, which includes the conduits 122 (e.g., conduit 124, 194, 196, 198). As shown, the conduits 122 are fluidly coupled to the valve 36 and the pump 38, such that the process fluid 18 flows from the valve 36 to the conduits 122. As shown, the conduits 122 correspond to the channels 114 of the DBD reactor 11. That is, in the illustrated embodiment the number of conduits 122 is the same as the number of channels 114. As shown, the conduits 122 longitudinally align with the channels 114 along the direction 120 (e.g., along a length of the DBD reactor 11). As shown, the conduits 122 are configured to eject (e.g., direct, spray, diffuse, etc.) the processing fluid 18 toward the dielectric barriers 90 to cool the dielectric barriers 90. It may be appreciated that the cooling of the dielectric barriers 90 mitigates wear and/or damage to the dielectric barriers 90 and also improves the performance of the DBD reactor 11.

In the illustrated embodiment, the DBD system 12 includes the one or more sensors 66 configured to monitor one or more characteristics of the DBD reactor 11 (e.g., temperature of the dielectric barriers 90). In certain embodiments, the controller 40 may be configured to control the flow rate of the process fluid 18 by sending instructions to the actuator 67 of valve 36 and/or the pump 38 based on one or more measurements received from the one or more sensors 66. In certain embodiments, the flow rate of the process fluid through the individual conduits 122 may be controlled independently via the controller 40. For example, the one or more sensors 66 may indicate that the temperature of the dielectric barrier 92 is higher than the temperature of the dielectric barrier 154. The controller 40 may then control the valve 36 (e.g., and additional valves) to cause the flow rate of the process fluid 18 in the conduit 124 to be greater than the flow rate of the process fluid 18 in the conduit 196.

Figure 4:
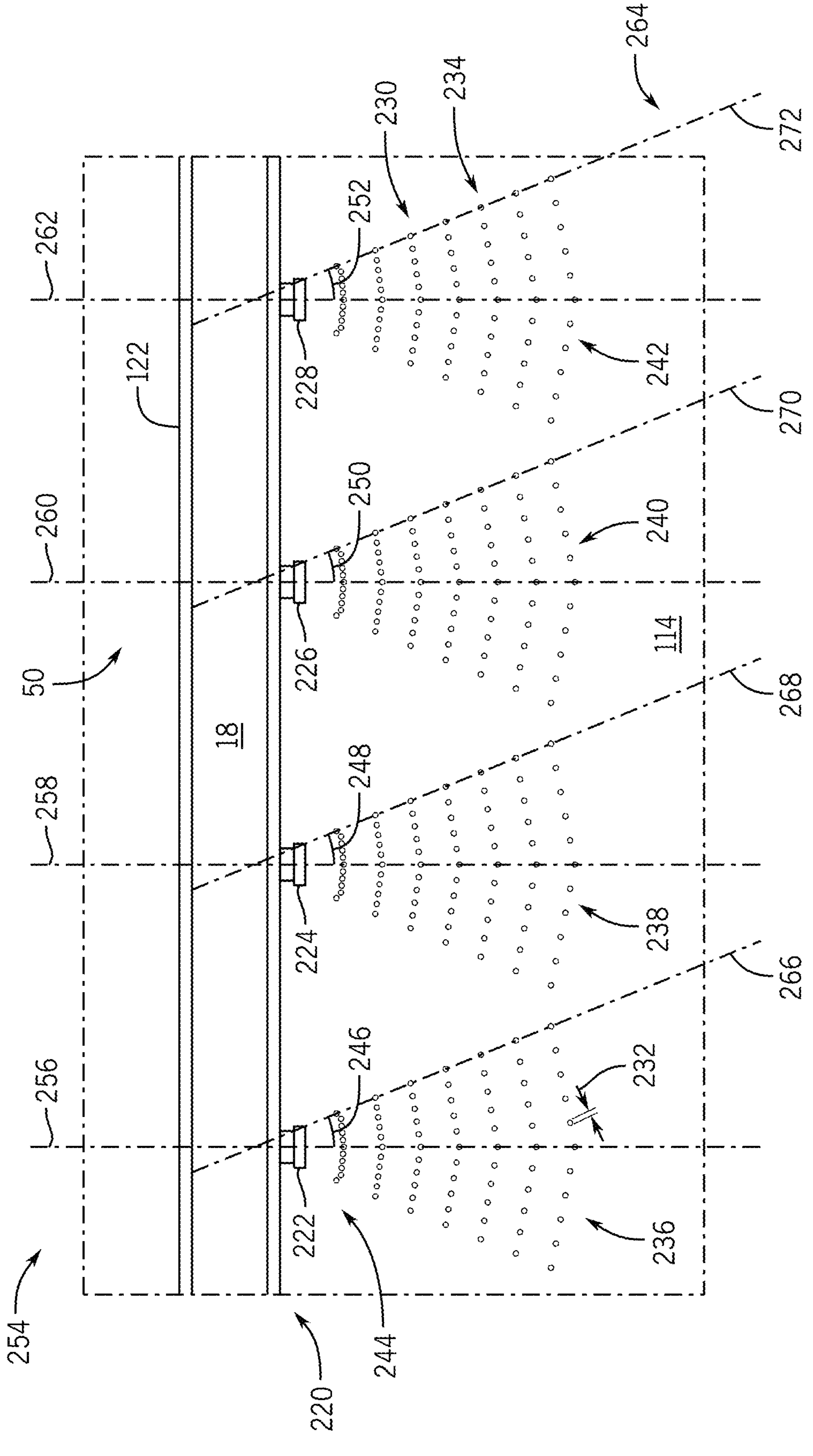
FIG. 4 is a side cross-sectional view of an embodiment of a conduit of the diffuser, illustrating the conduit having a plurality of nozzles.

FIG. 4 is a side cross-sectional view of an embodiment of a conduit 122 of the diffuser 50, illustrating the conduit 122 having a plurality of nozzles 220 (e.g., nozzles 222, 224, 226, 228). As discussed herein, the nozzles 220 may be configured to aerosolize (e.g., nebulize, vaporize, etc.) the process fluid 18 into a plurality of droplets 230 that are dispersed (e.g., diffused) into the channels 114. In certain embodiments, a diameter 232 (e.g., average or mean diameter) of the droplets 230 is less than or equal to 0.1 millimeters (mm), 0.2 mm, 0.3 mm, 0.4 mm, 0.5 mm, 0.6 mm, 0.7 mm, 0.8 mm, 0.9 mm, or 1 mm. In certain embodiments, the diameter 232 of the droplets 230 is between 0.001 mm and 1 mm. It may be appreciated that the aerosolized droplets 230 may be carried through the channels 114 by the gas flow 14, thereby improving cooling of the dielectric barriers. As discussed herein, the conduits 122 may include one or more nozzles 220.

In certain embodiments, one or more geometric parameters of the nozzles 220 may be adjustable. For example, in certain embodiments, the spread of the sprays 234 (e.g., sprays 236, 238, 240, 242) of the process fluid 18 that emanate from the nozzles 220 may be varied by the controller. As shown, the spread of the sprays 234 may be characterized by angles 244 (e.g., angles 246, 248, 250, 252) between central axes 254 (e.g., central axes, 256, 258, 260, 262) and outer edges 264 (e.g., outer edges 266, 268, 270, 272). In certain embodiment, the controller may be configured to control the spread of the sprays 234, the diameter 232 of the droplets 230, or any combination thereof. In certain embodiments, the controller may be configured to control one or more supporting vaporization systems (e.g., nebulizing systems) to assist with vaporization of the sprays 234. For example, the supporting vaporization systems may include a pneumatic nebulizer that supplies a high velocity compressed gas to help vaporize the process fluid 18, an ultrasonic nebulizer configured to apply ultrasonic energy to help vaporize the process fluid 18, or any combination thereof.

In certain embodiments, a temperature of the process fluid 18 injected into the channels 114 is between 90 degrees Celsius and 100 degrees Celsius. In certain embodiment, the controller may be configured to control and/or adjust a temperature, a pressure, a flow rate, or any combination thereof, of the process fluid 18 through the diffuser 50 into the one or more channels 114 of the DBD reactor.

Figure 5:
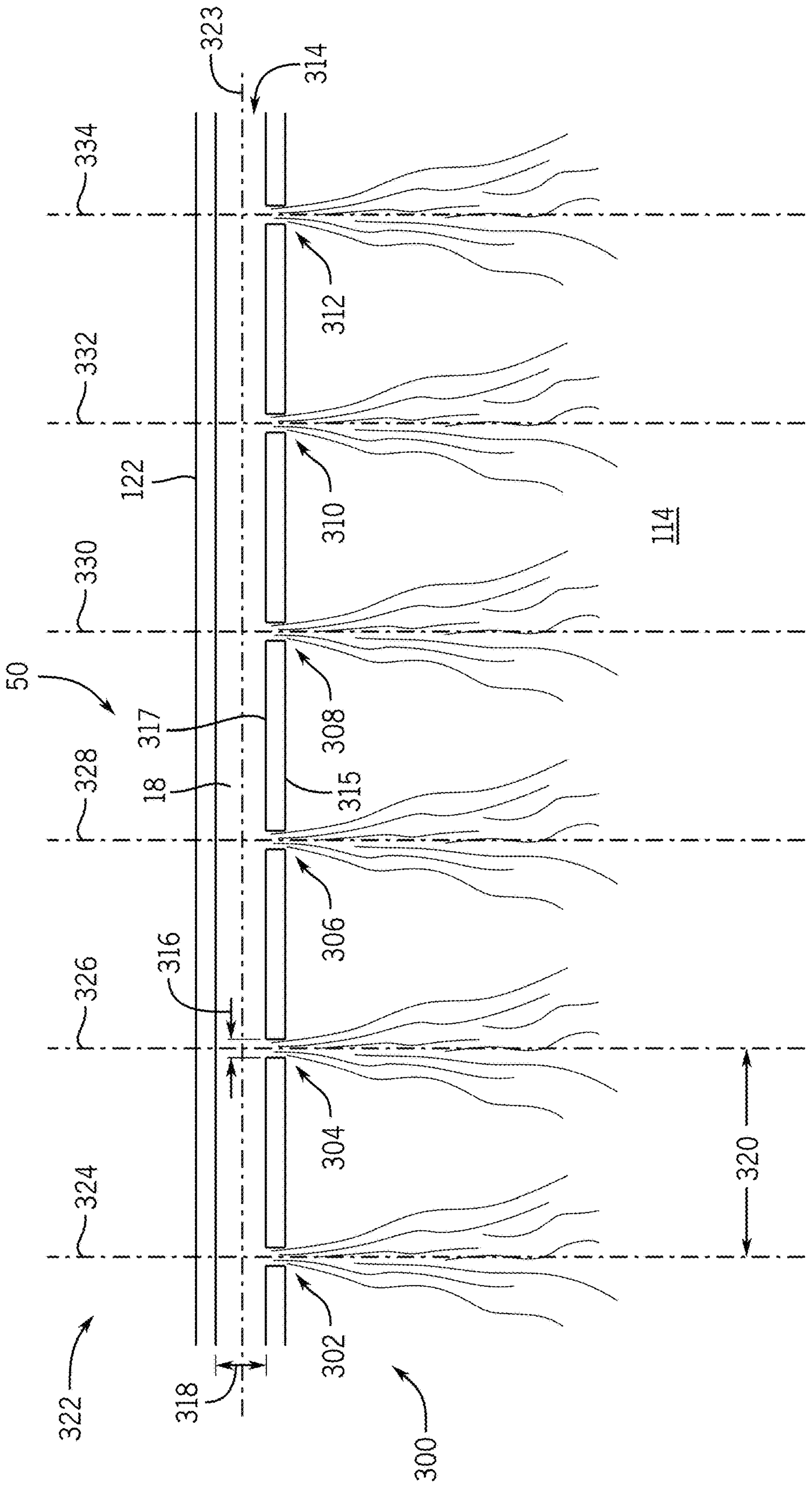
FIG. 5 is a side cross-sectional view of an embodiment of a conduit of the diffuser, illustrating the conduit having a plurality of apertures.

FIG. 5 is a side cross-sectional view of an embodiment of a conduit 122 of the diffuser 50, illustrating the conduit 122 having a plurality of apertures 300 (e.g., apertures 302, 304, 306, 308, 310, 312). As shown, an interior 314 of the conduit(s) 122 are directly fluidly coupled to the one or more channels 114 via the apertures 300. The process fluid 18 does not pass through a protruding nozzle and is not nebulized prior to entering the one or more channels 114. That is, the process fluid 18 is directly injected into the one or more channels 114 from the conduit(s) 122 via the apertures 300, which are formed directly in a wall of the conduit(s) 122 (e.g., flush with a surface of the conduits). As shown, the apertures 300 extend from an outer surface 315 of the conduit 122 to an inner surface 317 of the conduit 122.

In the illustrated embodiment, a diameter 316 of the apertures 300 is less than a diameter 318 of the conduit 122. In certain embodiments, the diameter 316 of the apertures is less than 0.05 millimeters (mm), 0.01 mm, 0.05 mm, 0.1 mm, or 1 mm. In certain embodiments, a ratio between the diameter 316 of the apertures 300 and the diameter 318 of the conduit 250 is between 1:100 and 1:10. In the illustrated embodiment, the apertures 300 are equally spaced from each other. In certain embodiments, a distance 320 between consecutive central axes 322 of the apertures 300 may vary. In the illustrated embodiment, the apertures 300 are directed normal to a central axis 323 of the conduit 122. That is, central axes 322 (e.g., central axes 324, 326, 328, 330, 332, 334) of the apertures 300 are perpendicular (e.g., normal, orthogonal, etc.) to the central axis 324. In certain embodiments, the central axes 322 may not be perpendicular to the central axis 323. For example, in certain embodiments, one or more of the apertures 300 may be directed diagonally toward a dielectric barrier to cause the sprayed process fluid 18 to flow down an outer surface (e.g., face) of the dielectric barrier.

In certain embodiments, the features of FIGS. 4 and 5 may be used in combination with one another on the same or different conduits 122, such as shown in FIG. 3. For example, the diffuser 152 may include nozzles 220 as shown in FIG. 4, apertures 300 (e.g., flush apertures) as shown in FIG. 5, or any combination thereof. In some embodiments, the nozzles 220 may be coupled to a wall of the DBD reactor, in conduits within the DBD reactor, or any combination thereof. In some embodiments, the diffuser system 102 may be configured to vaporize the process fluid 18 outside and/or upstream of the dielectric barriers, such as within the inlet header or the inlet of the DBD reactor, rather than directly at the dielectric barriers. For example, the diffuser system 102 may include a vaporization chamber coupled to the inlet header and/or the conduits described above, such that a vapor flow of the process fluid 18 is supplied into the inlet header.

Figure 6:
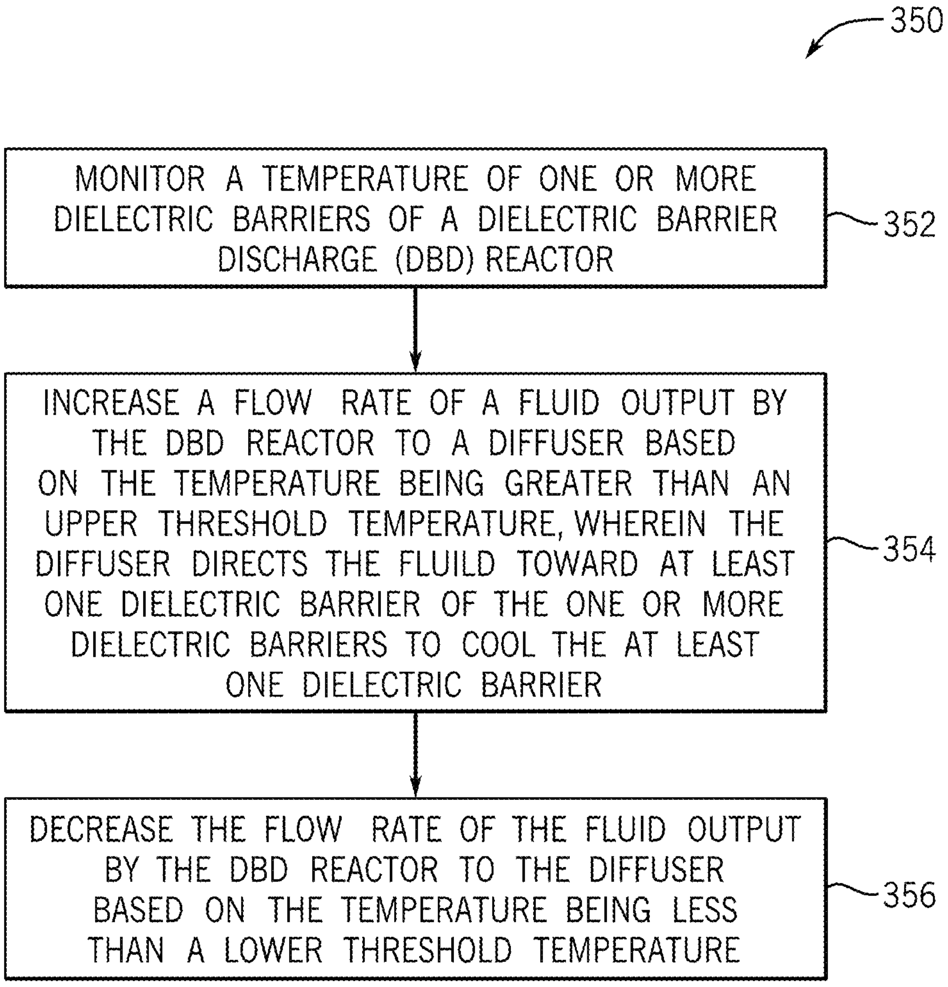
FIG. 6 is a flowchart of an example process for operating the diffuser system.

FIG. 6 is a flowchart of an example process 350 for operating the diffuser system 12. The process 350 may be performed by a processor-based computing device or controller 40 disclosed above with reference to FIG. 1-3 or any other suitable computing device(s) or controller(s). Furthermore, the blocks of the process 350 may be performed in the order disclosed herein or in any other suitable order. For example, certain blocks of the process 350 may be performed concurrently. In addition, in certain embodiments, at least one of the blocks of the process 350 may be omitted.

In block 352 of the process 350, the controller 40, via the one or more sensors 66, monitors a temperature of the dielectric barriers 90 of the DBD reactor 11. In certain embodiments, the one or more sensors 66 may measure temperatures of individual dielectric barriers 90. In certain embodiments, the one or more sensors 66 may provide a signal indicative of an aggregate (e.g., mean, average, median, etc.) temperature of the dielectric barriers 90. In certain embodiments, the one or more sensors 66 may include one or more temperature sensors (e.g., thermocouples) coupled to an outer face and/or an interior of one or more of the dielectric barriers 90.

In block 354 of the process 350, the controller 40 controls the valve 36, the pump 38, or both, to increase a flow rate of the process fluid 18 output by the DBD reactor 11 to the diffuser 50 based on the monitored temperature being greater than an upper threshold temperature. As discussed herein, the diffuser 50 directs the processing fluid 18 toward one or more of the dielectric barriers 90 to cool at least one of the dielectric barriers 90. In certain embodiments, the upper threshold temperature may be obtained by adding a deadband value to a target temperature. For example, the target temperature may be 95 degrees Celsius and the deadband value may be 5 degrees Celsius. By summing the target temperature and the deadband temperature, the resulting upper temperature threshold would be 100 degrees Celsius. In certain embodiments, the target temperature and/or the deadband value may be adjustable. In certain embodiments, the controller 40 may be configured to increase the flow rate of the process fluid 18 by a fixed amount. For example, the flow rate of the process fluid 18 may be increased by 5 percent. In certain embodiments, the amount by which the flow rate of the process fluid 18 is increased may be adjustable. In certain embodiments, the controller 40 may increase the flow rate of the process fluid 18 by controlling the valve 36, the pump 38, or both.

In block 356 of the process 350, the controller 40 controls the valve 36, the pump 38, or both, to decrease a flow rate of the process fluid 18 output by the DBD reactor 11 to the diffuser 50 based on the monitored temperature being less than a lower threshold temperature. In certain embodiments, the lower threshold temperature may be obtained by subtracting a deadband value to a target temperature. For example, the target temperature may be 95 degrees Celsius and the deadband value may be 5 degrees Celsius. By subtracting the deadband temperature from the target temperature, the resulting lower temperature threshold would be 90 degrees Celsius. In certain embodiments, the target temperature and/or the deadband value may be adjustable. In certain embodiments, the controller 40 may be configured to decrease the flow rate of the process fluid 18 by a fixed amount. For example, the flow rate of the process fluid 18 may be decreased by 5 percent. In certain embodiments, the amount by which the flow rate of the process fluid 18 is increased may be adjustable. In certain embodiments, the controller 40 may decrease the flow rate of the process fluid 18 by controlling the valve 36, the pump 38, or both.

In certain embodiments, the controller 40 may be configured to control additional variables within the DBD reactor 11. For example, the controller 40 may be configured to control an internal pressure, an internal humidity, or a combination thereof. Additionally or alternatively, the controller 40 may be configured to trigger an alarm and/or initiate a shut down in response to a safety lock being activated. For example, the controller 40 may be configured to activate an alarm or initiate a shutdown in response to a temperature exceeding a safety threshold temperature, the flow rate of the process fluid 18 dropping below a safety threshold flow rate, and/or an internal pressure exceeding a safety threshold pressure.

Technical effects of the disclosed embodiments include recirculating a portion 34 of a process fluid 18 output by a DBD reactor 11 to a diffuser system 12 to be diffused back into the DBD reactor 11 to cool one or more dielectric barriers 90 of the DBD reactor 11. It may be appreciated that cooling the one or more dielectric barriers 90 may mitigate damage and/or wear to the dielectric barriers 90 due to overheating. Additional technical effects include a control system for adjusting a flow rate of the diffused process fluid 18 to maintain a target (e.g., optimal) temperature of the dielectric barriers 90. Additional technical effects include recirculating the process fluid 18 to maximize the efficiency (e.g., performance) of the DBD system 10 by increasing the volume of a heavy gas via addition of the process fluid 18, and also to minimize the use of additional components.

The subject matter described in detail above may be defined by one or more clauses, as set forth below.

According to a first aspect, a system includes a dielectric barrier discharge (DBD) reactor. The DBD reactor includes a plurality of dielectric barriers. The DBD reactor also includes a plurality of electrodes disposed between the plurality of dielectric barriers. The system also includes a diffuser system fluidly coupled to an outlet of the DBD reactor. The diffuser system is configured to direct a fluid output through the outlet to one or more channels disposed between the plurality of dielectric barriers. The diffuser system includes a diffuser configured to diffuse the fluid into the one or more channels to cool at least one dielectric barrier of the plurality of dielectric barriers.

The system of the preceding clause, wherein the DBD reactor includes: an inlet header disposed on a first longitudinal side of the plurality of dielectric barriers, wherein the inlet header is fluidly coupled to the one or more channels; and an outlet header disposed on a second longitudinal side of the plurality of dielectric barriers, wherein the outlet header is fluidly coupled to the one or more channels.

The system of any preceding clause, wherein the inlet header is configured to distribute a gas to the one or more channels, the outlet header is configured to combine the gas from the one or more channels, and the gas is configured to travel from the inlet header to the outlet header along a first dimension.

The system of any preceding clause, wherein the diffuser is disposed on a side of the plurality of dielectric barriers, wherein the diffuser extends between the inlet header and the outlet header along the first dimension.

The system of any preceding clause, wherein the diffuser is configured to inject the fluid into the one or more channels along a second dimension, wherein the second dimension is crosswise to the first dimension.

The system of any preceding clause, wherein the diffuser includes one or more conduits configured to receive the fluid from the outlet of the DBD reactor, wherein the one or more conduits correspond to the one or more channels of the DBD reactor.

The system of any preceding clause, wherein the one or more conduits are aligned with the one or more channels along the first dimension.

The system of any preceding clause, wherein a conduit of the one or more conduits includes a plurality of apertures, wherein the plurality of apertures extend from an outer surface of the conduit to an interior of the conduit.

The system of any preceding clause, wherein the diffuser includes a plurality of nozzles fluidly coupled to the plurality of apertures, wherein the plurality of nozzles is configured to: aerosolize the fluid into a plurality of droplets; and inject the plurality of droplets into the one or more channels.

The system of any preceding clause, wherein a diameter of each droplet of the plurality of droplets is between 0.001 millimeters and 1 millimeter.

The system of any preceding clause, wherein the diffuser is configured to diffuse the fluid into an inlet of the DBD reactor.

According to a second aspect, a system includes a diffuser system fluidly coupled to an outlet of a dielectric barrier discharge (DBD) reactor. The diffuser system is configured to direct a fluid output through the outlet to one or more channels disposed between a plurality of dielectric barriers of the DBD reactor. The diffuser system includes a diffuser configured to diffuse the fluid into the one or more channels to cool at least one dielectric barrier of the plurality of dielectric barriers. The system also includes a controller having a memory and one or more processors. The controller is configured to monitor a temperature of a dielectric barrier of the plurality of dielectric barriers. The controller is also configured to adjust a flowrate of the fluid based on the temperature.

The system of the preceding clause, wherein the diffuser system includes a pump fluidly coupled to the diffuser, wherein the controller is configured to cause the pump to adjust a pump speed based on the temperature.

The system of any preceding clause, wherein the diffuser system includes a valve fluidly coupled to the diffuser, wherein the controller is configured to instruct an actuator to adjust the valve based on the temperature.

The system of any preceding clause, wherein the controller is configured to: cause the pump to adjust the pump speed in response to the temperature exceeding a high temperature threshold or falling below a low temperature threshold; instruct the actuator to adjust the valve in response to the temperature exceeding the high temperature threshold or falling below the low temperature threshold; or both.

The system of any preceding clause, wherein the DBD reactor includes: the plurality of dielectric barriers; a plurality of electrodes disposed between the plurality of dielectric barriers; an inlet header disposed on a first lateral side of the plurality of dielectric barriers, wherein the inlet header is fluidly coupled to the one or more channels; and an outlet header disposed on a second lateral side of the plurality of dielectric barriers, wherein the outlet header is fluidly coupled to the one or more channels.

The system of any preceding clause, wherein the one or more channels are configured to: receive a gas from the inlet header; and eject the gas into the outlet; wherein the gas is configured to travel from the inlet header to the outlet header along a first dimension.

The system of any preceding clause, wherein the diffuser is disposed on a third lateral side of the plurality of dielectric barriers, wherein the diffuser extends from the inlet header toward to the outlet header along the first dimension.

According to a third aspect, a method includes monitoring, via a processor, a temperature of a dielectric barrier of a dielectric barrier discharge (DBD) reactor. The method also includes controlling, via the processor, a valve, a pump, or both, to adjust a flow rate of a fluid directed from an outlet of the DBD reactor to a diffuser based on the temperature. The method also includes injecting, via the diffuser, the fluid toward the dielectric barrier to cool the dielectric barrier.

The method of the preceding clause, including: controlling, via the processor, the valve, the pump, or both, to reduce the flow rate of the fluid in response to the temperature falling below a low temperature threshold; and controlling, via the processor, the valve, the pump, or both, to increase the flow rate of the fluid in response to the temperature exceeding a high temperature threshold.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
- a dielectric barrier discharge (DBD) reactor, comprising:
  - a plurality of dielectric barriers; and
  - a plurality of electrodes disposed between the plurality of dielectric barriers; and
- a diffuser system fluidly coupled to an outlet of the DBD reactor, wherein the diffuser system is configured to direct a fluid output through the outlet to one or more channels disposed between the plurality of dielectric barriers, the diffuser system comprises a diffuser configured to diffuse the fluid into the one or more channels to cool at least one dielectric barrier of the plurality of dielectric barriers, the diffuser comprises one or more conduits, a conduit of the one or more conduits comprises a plurality of apertures, and the plurality of apertures extend from an outer surface of the conduit to an interior of the conduit.

2. The system of claim 1, wherein the DBD reactor comprises:
- an inlet header disposed on a first longitudinal side of the plurality of dielectric barriers, wherein the inlet header is fluidly coupled to the one or more channels; and
- an outlet header disposed on a second longitudinal side of the plurality of dielectric barriers, wherein the outlet header is fluidly coupled to the one or more channels.

3. The system of claim 2, wherein the inlet header is configured to distribute a gas to the one or more channels, the outlet header is configured to combine the gas from the one or more channels, and the gas is configured to travel from the inlet header to the outlet header along a first dimension.

4. The system of claim 3, wherein the diffuser is disposed on a side of the plurality of dielectric barriers, wherein the diffuser extends between the inlet header and the outlet header along the first dimension.

5. The system of claim 4, wherein the diffuser is configured to inject the fluid into the one or more channels along a second dimension, wherein the second dimension is crosswise to the first dimension.

6. The system of claim 4, wherein the one or more conduits are configured to receive the fluid from the outlet of the DBD reactor, wherein the one or more conduits correspond to the one or more channels of the DBD reactor.

7. The system of claim 6, wherein the one or more conduits are aligned with the one or more channels along the first dimension.

8. The system of claim 7, wherein the diffuser includes a plurality of nozzles fluidly coupled to the plurality of apertures, wherein the plurality of nozzles is configured to:
- aerosolize the fluid into a plurality of droplets; and
- inject the plurality of droplets into the one or more channels.

9. The system of claim 8, wherein a diameter of each droplet of the plurality of droplets is between 0.001 millimeters and 1 millimeter.

10. The system of claim 1, wherein the diffuser is configured to diffuse the fluid into an inlet of the DBD reactor.

11. A system, comprising:
- a diffuser system fluidly coupled to an outlet of a dielectric barrier discharge (DBD) reactor, wherein the diffuser system is configured to direct a fluid output through the outlet to one or more channels disposed between a plurality of dielectric barriers of the DBD reactor, and the diffuser system comprises:
  - a diffuser configured to diffuse the fluid into the one or more channels to cool at least one dielectric barrier of the plurality of dielectric barriers; and
  - a pump fluidly coupled to the diffuser; and
- a controller comprising a memory and one or more processors, wherein the controller is configured to:
  - monitor a temperature of a dielectric barrier of the plurality of dielectric barriers; and
  - adjust a pump speed of the pump to adjust a flowrate of the fluid based on the temperature.

12. The system of claim 11, wherein the diffuser system comprises a valve fluidly coupled to the diffuser, wherein the controller is configured to instruct an actuator to adjust the valve based on the temperature.

13. The system of claim 12, wherein the controller is configured to:
- cause the pump to adjust the pump speed in response to the temperature exceeding a high temperature threshold or falling below a low temperature threshold;

instruct the actuator to adjust the valve in response to the temperature exceeding the high temperature threshold or falling below the low temperature threshold;

or both.

14. The system of claim 11, wherein the DBD reactor comprises:

the plurality of dielectric barriers;

a plurality of electrodes disposed between the plurality of dielectric barriers;

an inlet header disposed on a first lateral side of the plurality of dielectric barriers, wherein the inlet header is fluidly coupled to the one or more channels; and an outlet header disposed on a second lateral side of the plurality of dielectric barriers, wherein the outlet header is fluidly coupled to the one or more channels.

15. The system of claim 14, wherein the one or more channels are configured to:

receive a gas from the inlet header; and eject the gas into the outlet;

wherein the gas is configured to travel from the inlet header to the outlet header along a first dimension.

16. The system of claim 15, wherein the diffuser is disposed on a third lateral side of the plurality of dielectric barriers, wherein the diffuser extends from the inlet header toward to the outlet header along the first dimension.

17. A method, comprising:

monitoring, via a processor, a temperature of a dielectric barrier of a dielectric barrier discharge (DBD) reactor;

controlling, via the processor, a pump speed of a pump to adjust a flow rate of a fluid directed from an outlet of the DBD reactor to a diffuser based on the temperature, wherein the pump is fluidly coupled to the diffuser; and injecting, via the diffuser, the fluid toward the dielectric barrier to cool the dielectric barrier.

18. The method of claim 17, comprising:

controlling, via the processor, a valve, the pump, or both, to reduce the flow rate of the fluid in response to the temperature falling below a low temperature threshold; and controlling, via the processor, the valve, the pump, or both, to increase the flow rate of the fluid in response to the temperature exceeding a high temperature threshold.

19. The system of claim 1, wherein a diameter of each aperture of the plurality of apertures is less than one millimeter.

20. The system of claim 1, wherein the diffuser system is fluidly coupled to a drain outlet disposed on a bottom side of the DBD reactor, and the diffuser system is configured to direct the fluid output through the drain outlet to the one or more channels.

* * * * *